US007060367B2

(12) United States Patent
Yamada et al.

(10) Patent No.: US 7,060,367 B2

(45) Date of Patent: Jun. 13, 2006

(54) CUTTING BLADE AND METHOD OF PRODUCING THE SAME

(75) Inventors: Katsuaki Yamada, Seki (JP); Hiroshi Ohtsubo, Seki (JP); Hiroyuki Tashita, Wilsonville, OR (US)

(73) Assignee: Kai R&D Center Co., Ltd., Gifu (JP)

(*) Notice: Subject to any disclaimer, the term of this patent is extended or adjusted under 35 U.S.C. 154(b) by 491 days.

(21) Appl. No.: 10/297,399

(22) PCT Filed: Jun. 4, 2001

(86) PCT No.: PCT/JP01/04696

§ 371 (c)(1), (2), (4) Date: Dec. 5, 2002

(87) PCT Pub. No.: WO01/94083

PCT Pub. Date: Dec. 13, 2001

(65) Prior Publication Data

US 2004/0099120 A1 May 27, 2004

(30) Foreign Application Priority Data

Jun. 5, 2000 (JP) ............................ 2000-167359

(51) Int. Cl.

*B32B 15/00* (2006.01)

*B26B 21/60* (2006.01)

(52) U.S. Cl. ...................... 428/634; 428/583; 428/587; 428/610; 428/641; 428/649; 428/650; 428/656; 428/938; 30/346.53; 30/346.54; 30/346.55; 30/346.58; 30/350; 76/DIG. 8

(58) Field of Classification Search ................ 428/634, 428/641, 649, 650, 656, 583, 587, 610, 938; 30/346.53, 346.54, 346.55, 346.58, 350; 76/DIG. 8

See application file for complete search history.

(56) References Cited

U.S. PATENT DOCUMENTS

| | | | | |
|---|---|---|---|---|
| 3,606,682 | A * | 9/1971 | Camp et al. | 30/346.55 |
| 5,032,243 | A | 7/1991 | Bache et al. | 204/192.34 |
| 5,232,568 | A | 8/1993 | Parent et al. | 30/346.53 |
| 5,295,305 | A | 3/1994 | Hahn et al. | 30/50 |
| 5,795,648 | A | 8/1998 | Goel et al. | 428/336 |

FOREIGN PATENT DOCUMENTS

| | | |
|---|---|---|
| DE | 25 12 001 | 10/1975 |
| EP | 0828 015 A2 | 11/1998 |
| EP | 0884 142 A1 | 12/1998 |
| EP | 0884142 A1 * | 12/1998 |
| GB | 426 489 | 4/1935 |
| JP | 58-206788 | 12/1983 |
| JP | 60-160951 | 8/1985 |
| WO | WO 92 17323 | 10/1992 |
| WO | WO92/17323 A1 * | 10/1992 |

* cited by examiner

*Primary Examiner*—Robert R. Koehler

(74) *Attorney, Agent, or Firm*—Boyle Fredrickson Newholm Stein & Gratz S.C.

(57) ABSTRACT

A blade with improved sharpness and durability is disclosed. The blade includes a base plate having an edge and a coating layer for coating the edge. The coating layer is formed of a material handling metal, and a tip of the coating layer is sharpened. It is preferred that an angle (Ba) between two tapered surfaces be between 15 to 45 degrees.

34 Claims, 5 Drawing Sheets

CUTTING BLADE AND METHOD OF PRODUCING THE SAME

BACKGROUND OF THE INVENTION

1. Field of the Invention

The present invention relates to a blade, and more particularly, to a blade having a coating layer on its edge and a method for manufacturing such blade.

2. Background Art

In the prior art, there are a variety of methods to process a blade, such as a razor or microtome, to sharpen the blade. For example, there is a process in which the surface of a blade is coated by a 100% chrome film.

SUMMARY OF THE PRESENT INVENTION

It is an objective of the present invention to provide a sharp blade having improved durability.

To achieve the above objective, a first perspective of the present invention provides a blade including a base plate having an edge and a mixture layer formed by coating layer for coating at least the edge of the base plate. The coating layer includes at least one metal, which is selected from a group consisting of Pt, Zr, W, Ti, Ag, Cu, Co, Fe, Ge, Al, Mg, Zn, and Cr, and a carbon material.

A second perspective of the present invention provides a blade including a base plate having an edge and a coating layer for coating at least the edge. The coating layer includes an intermediate layer which main component is at least one metal selected from a group consisting of Pt, Zr, W, Ti, Ag, Cu, Co, Fe, Ge, Al, Mg, Zn, and Cr, and a carbon layer formed on the intermediate layer.

A third perspective of the present invention provides a blade including a base plate having an edge and a coating layer for coating at least the edge. The coating layer includes an intermediate layer which main component is at least one metal, which is selected from a group consisting of Pt, Zr, W, Ti, Ag, Cu, Co, Fe, Ge, Al, Mg, Zn, and Cr, and a mixture layer formed on the intermediate layer and including at least one metal, which is selected from a group consisting of Pt, Zr, W, Ti, Ag, Cu, Co, Fe, Ge, Al, Mg, Zn, and Cr, and a carbon material.

A fourth perspective of the present invention provides a blade including a base plate having an edge, which is formed to become narrowed toward a tip of the edge, and a coating layer for coating at least the edge. The coating layer is formed by partially removing the coating layer at the tip side of the edge and has at least one tapered surface, which is tapered toward the tip of the edge.

A fifth perspective of the present invention provides a blade including an edge defined by two surfaces. The edge includes a tapered surface formed by partially removing at least one of the two surfaces.

A sixth perspective of the present invention provides a blade including a base plate having an edge defined by two surfaces and a coating layer for coating the base plate. The base plate includes two first inner tapered surfaces, which extend along the two surfaces from an end of the base plate, and two second inner tapered surfaces, which extend continuously from the two first inner tapered surfaces, respectively. An angle between the two first inner tapered surfaces is greater than an angle between the two second inner tapered surfaces. The coating layer includes two first outer tapered surfaces, connected to each other at a tip of the edge, and two second outer tapered surfaces, which extend continuously from the two first outer tapered surfaces, respectively. An angle between the two first outer tapered surfaces is greater than an angle between the two second outer tapered surfaces.

A seventh perspective of the present invention provides a method for manufacturing a blade including the steps of preparing a base plate having two surfaces, forming the two surfaces of the base plate so that the space between the two surfaces is narrowed as an end of the base plate becomes closer, forming a coating layer for coating at least the end of the base plate, and forming at least one tapered surface, which is tapered from a position corresponding to the edge of the coating layer, by partially removing the coating layer.

An eighth perspective of the present invention provides a method for manufacturing a blade including the steps of preparing a base plate having two surfaces and an end defined by the two surfaces, forming a coating layer for coating at least the end of the base plate, forming a tapered surface by removing at least one of two surfaces of the coating layer corresponding to the two surfaces of the base plate, and forming a second coating layer on the coating layer.

A ninth perspective of the present invention provides a method for manufacturing a blade including the steps of preparing a base plate having two surfaces, forming the two surfaces of the base plate so that the space between the two surfaces become narrowed as an end of the base plate becomes closer, and forming a tapered surface by removing at least one of the two surfaces of the base plate.

A tenth perspective of the present invention provides a method for manufacturing a blade including the steps of, preparing a base plate having two surfaces, forming the two surfaces of the base plate so that the space between the two surfaces become narrowed as an end of the base plate becomes closer, forming a tapered surface by removing at least one of the two surfaces of the base plate, and forming a coating layer for coating the tapered surface.

DETAILED DESCRIPTION OF THE PREFERRED EMBODIMENTS

Figure 7:
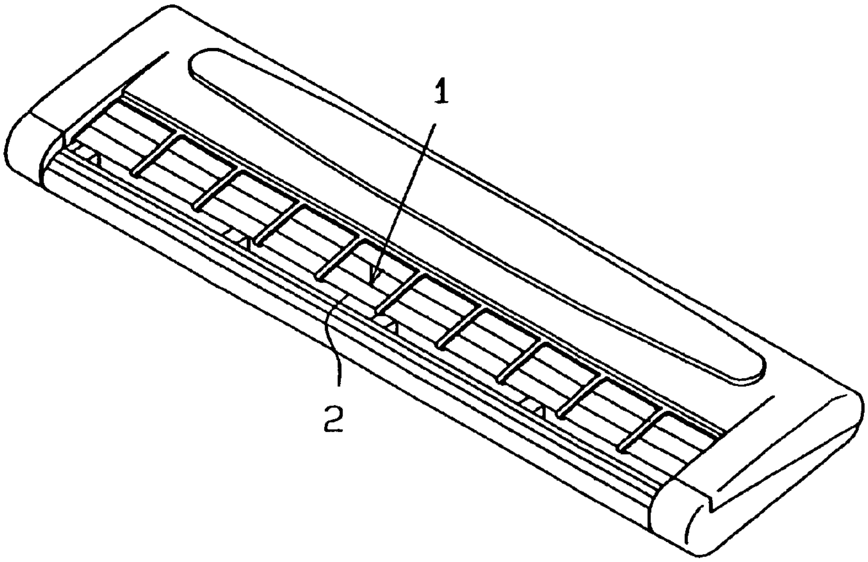
FIG. 7 is a perspective view of a head portion of a razor having the razor blade of FIG. 1.

In a first embodiment of the present invention, a method for manufacturing a blade 1, which is attached to a razor shown in FIG. 7, or a method for processing an edge 2, will be described with reference to the attached drawings.

The blade 1 is manufactured from a base plate 3 through the following steps. In the first step, the base plate 3 is ground to form tapered side surfaces 4, 5. More specifically, the tapered side surfaces 4, 5 are formed so that the base plate 3 narrows at positions closer to the distal end and so that the angles of the tapered side surfaces 4, 5 relative to a middle plane 3*a* is the same, as shown in FIG. 1(*a*). Preferred materials of the base plate 3 are carbon steel, stainless steel, aluminum alloy, fine ceramics, such as zirconium or alumina, and hard metal, such as tungsten carbide (WC).

In a second step, both surfaces 4 and 5 are ground and finished, as shown in FIG. 1(*b*). The grinding may be omitted.

In a third step, a blade finishing process is performed, as described below.

Referring to FIG. 1(*c*), an upper end portion of the base plate 3 is removed (bombardment process) and finished. In other words, first surfaces 4*a*, 5*a* are formed at positions near the upper end of the base plate 3 to sharpen the upper end of the base plate 3. Second surfaces 4*b*, 5*b*, which are respectively continuous to the first surfaces 4*a*, 5*a*, are part of the surfaces 4, 5 prior to the removal. It is preferred that the first surfaces 4*a*, 5*a* define an edge forming angle αa that is greater than an edge forming angle αb defined by the second surfaces 4*b*, 5*b*. The first surfaces 4*a*, 5*a* may be flush with the second surfaces 4*b*, 5*b*. In this case, the two angles of αa, αb are equal to each other. Further, the edge forming angle αa defined by the two first surfaces 4*a*, 5*a* may be smaller than the edge forming angle αb defined by the two second surfaces 4*b*, 5*b*. It is preferred that the third step be performed by carrying out dry etching, such as sputter etching. It is preferred that the removal dimension L1 of the upper end portion of the base plate 3 be between 10 to 200 nm. It is preferred that the edge forming angle αb be between 17 to 25 degrees and that the edge forming angle αa be between 17 to 30 degrees.

In a fourth step, the base plate 3 is coated by the coating layer 6, as shown in FIG. 1(*d*). The coating layer 6 includes a left side surface 7 and a right side surface 8, which are formed substantially along the surfaces 4, 5 of the base plate 3.

In a fifth step, the coating layer 6 at the vicinity of the upper end of the base plate 3 is removed and finished. In other words, first surfaces 7*a*, 8*a* are formed at positions near the upper end of the coating layer 6 to sharpen the upper end of the coating layer 6. Second surfaces 7*b*, 8*b*, which are respectively continuous to the first surfaces 7*a*, 8*a*, are part of the surfaces 7, 8 prior to the removal. It is preferred that the first surfaces 7*a*, 8*a* define an edge forming angle βa that is greater than an edge forming angle βb defined by the second surfaces 7*b*, 8*b*. The first surfaces 7*a*, 8*a* may be flush with the second surfaces 7*b*, 8*b*. In this case, the two angles βa, βb are equal to each other. Further, the edge forming angle βa of the two first surfaces 7*a*, 8*a* may be smaller than the edge forming angle βb of the two second surfaces 7*b*, 8*b*. It is preferred that the fifth step be performed by carrying out dry etching, such as sputter etching. It is preferred that the removal dimension L2 of the upper end portion of the coating layer 6 be between 5 to 150 nm. It is preferred that the edge forming angle βb be between 17 to 30 degrees and that the edge angle βa be between 17 to 45 degrees.

In a sixth step, a fluororesin layer 9 is formed on the coating layer 6, as shown in FIG. 1(*f*). The fluororesin layer 9 improves the sliding smoothness of the blade 1 during usage. The material of fluororesin layer 9 is, for example, polytetrafluoroethylene (PTFE).

Figure 2A:
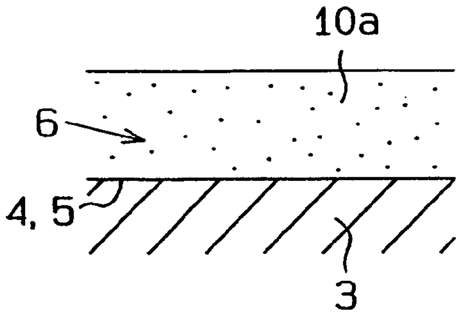
FIGS. 2 to 5 are enlarged cross-sectional views of a coating layer, which coats the edge.
Figure 2B:
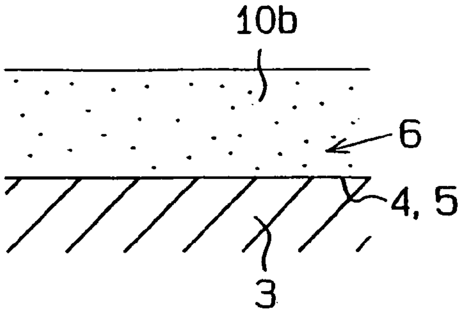

FIGS. 2(*a*), 2(*b*), 3, 4(*a*), 4(*b*), 5(*a*), 5(*b*), 5(*c*), and 5(*d*) each show an enlarged cross-sectional view of a preferred coating layer 6. The coating layer 6 of each drawing will now be described.

The materials of the coating layers 6 in FIGS. 2(*a*) and 2(*b*) include at least one metal selected from a group consisting of platinum (Pt), zirconium (Zr), tungsten (W), titanium (Ti), silver (Ag), copper (Cu), cobalt (Co), iron (Fe), germanium (Ge), aluminum (Al), magnesium (Mg), zinc (Zn), and chromium (Cr), and a hard carbon material, such as diamond-like carbon (DLC).

The coating layer 6 shown in FIG. 2(*a*) is a mixture layer 10*a*, in which the above selected metal is uniformly mixed in DLC. The coating layer 6 shown in FIG. 2(*b*) is a mixture layer 10*b*, in which a ratio of the selected metal (concentration) changes at positions closer to the surfaces 4, 5 of the base plate 3. In other words, the concentration of the selected metal in the mixture layer 10*b* increases or decreases as the base plate 3 becomes closer. For example, it is preferred that the concentration of the selected metal increase as the base plate 3 becomes closer to increase the adherence of the mixture layer 10*b* (the coating layer 6) and the base plate 3. This prevents the mixture layer 10*b* (the coating layer 6) from exfoliating from the base plate 3.

Figure 3:
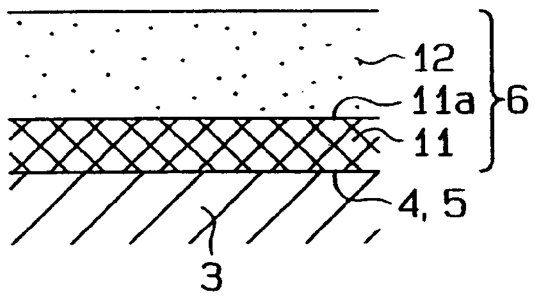

The coating layer 6 shown in FIG. 3 includes an intermediate layer 11, which coats the surfaces 4, 5 of the base plate 3, and a hard carbon layer (DLC layer) 12, which coats the surface 11*a* of the intermediate layer 11. The main component of the intermediate layer 11 is at least one metal selected from a group consisting of Pt, Zr, W, Ti, Ag, Cu, Co, Fe, Ge, Al, Mg, Zn, and Cr.

Figure 4A:
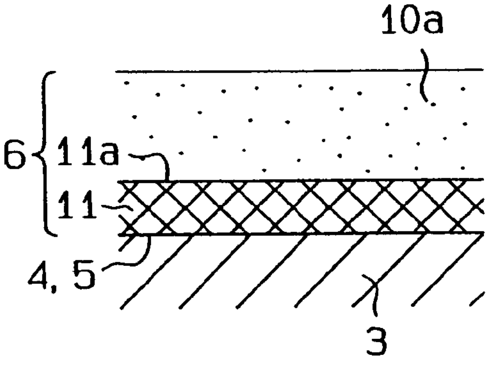
Figure 4B:
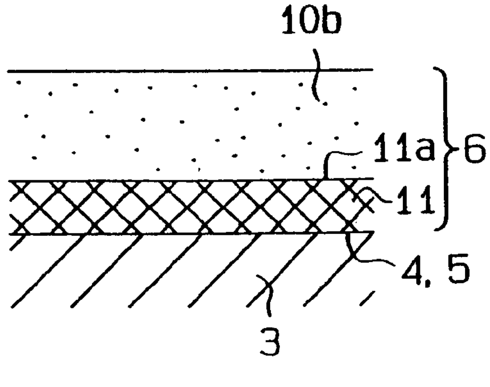

The coating layers 6 shown in FIG. 4(*a*) and 4(*b*) include an intermediate layer 11, which coats the surfaces 4, 5 of the base plate 3, and mixture layers 10*a*, 10*b*, which coat a surface 11*a* of the intermediate layer 11. The main component of the intermediate layer 11 is at least one metal selected from a group consisting of Pt, Zr, W, Ti, Ag, Cu, Co, Fe, Ge, Al, Mg, Zn, and Cr. The mixture layers 10*a*, 10*b* are each mixtures of at least one metal selected from a group consisting of Pt, Zr, W, Ti, Ag, Cu, Co, Fe, Ge, Al, Mg, Zn, and Cr and a hard carbon material, such as DLC. In the mixture layer 10*a* of FIG. 4(*a*), the selected metal is uniformly mixed in the DLC. In the mixture layer 10*b* shown in FIG. 4(*b*), the ratio of the selected metal (concentration) defines a gradient as the surface 11*a* of the intermediate layer 11 (the surfaces 4 and 5 of the base plate 3) becomes closer. In other words, the concentration of the selected metal increases or decreases as the intermediate layer 11 becomes closer. It is preferred that, for example, the concentration of the selected metal increase as intermediate layer 11 becomes closer. In this case, the adhesion of the mixture layer 10*b* and the intermediate layer 11 increases. This prevents the mixture layer 10*b* from exfoliating from the intermediate layer 11.

The coating layer 6 shown in FIG. 5(*a*) includes a DLC layer 12, which coats the mixture layer 10*a* of FIG. 4(*a*).

The coating layer 6 shown in FIG. 5(*b*) includes a DLC layer 12, which coats the mixture layer 10*b* of FIG. 4(*b*). It is preferred that the concentration of the selected metal in the mixture layer 10*b* of FIG. 5(*b*) increase as the intermediate layer 11 becomes closer. In this case, the adhesion of the mixture layer 10*b* and the intermediate layer 11 increases to prevent the mixture layer 10*b* from exfoliating from the intermediate layer 11. Since the concentration of carbon in the mixture layer 10*b* becomes higher as the DLC layer 12 becomes closer, the adhesion of the DLC layer 12 and the mixture layer 10*b* increases and prevents the DLC layer 12 from exfoliating from the mixture layer 10*b*. As a result, the sharpness and durability of the blade 1 increase.

Figure 5A:
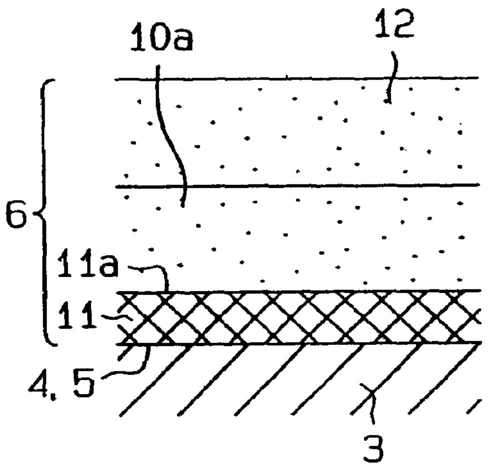

The coating layer 6 shown in FIG. 5(*c*) includes a plurality of (e.g., three) mixture layers 13*a*, 13*b*, 13*c* in lieu of the single mixture layer 10a of FIG. 5(a). The mixture layers 13a, 13b, and 13c each have a uniform metal composition. The compositions of mixture layers 13a, 13b, and 13c of FIG. 5(c) differ from one another.

Figure 5B:
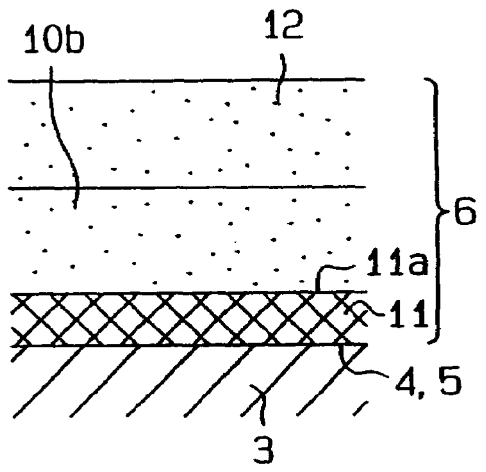
Figure 5C:
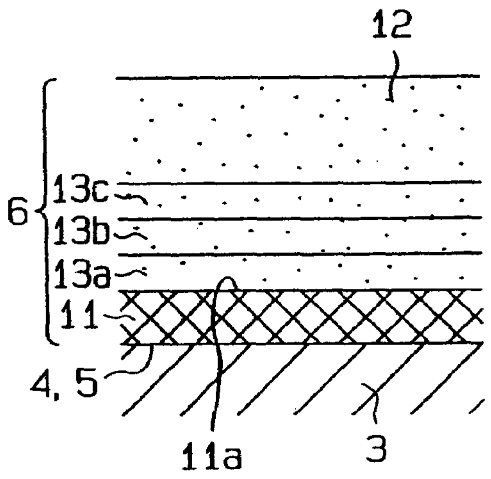
Figure 5D:
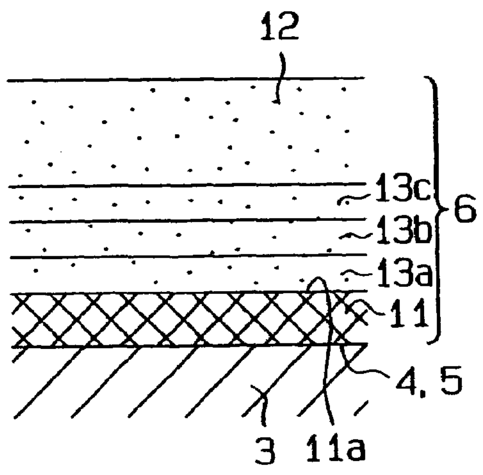

The coating layer 6 shown in FIG. 5(d) includes a plurality of (e.g., three) mixture layers 13a, 13b, and 13c in lieu of a single mixture layer 10b shown in FIG. 5(b). The mixture layers 13a, 13b, and 13c of FIG. 5(d) each have metal with concentration gradient.

The mixture layers 13a, 13b, and 13c of FIGS. 5(c) and 5(d) each include a metal or a composition of the metal selected as required from the above metal group. It is preferred that the composition be selected as required from, for example, *N (nitride), *CN (carbon nitride), and *C (carbide). Symbol * represents at least one metal of the metal group.

In addition, a plurality of the mixture layers 10a, 10b of FIGS. 2(a), 2(b), 4(a), 4(b), 5(a), and 5(b), the mixture layers 13a, 13b, and 13c of FIGS. 5(c) and 5(d), and the intermediate layers 11 of FIGS. 3, 4(a), 4(b) and FIGS. 5(a) to 5(d) may be superimposed. A coating layer 6 entirely or partially coats the edge 2. Further, the edge 2 may be coated by multiple types of coating layers 6.

A coating layer 6 is formed through processes including sputtering, such as high frequency sputter, high speed low temperature sputter (magnetron sputter), and reactive sputter, any type of vapor deposition, any type of ion plating, and any type of vapor phase growth (CVD).

Hard carbon includes, for example, diamond.

Pt, Zr, W, Ti, Ag, Cu, Co, Fe, Ge, Al, Mg, Zn and Cr may be used as a single substance, an alloyed metal with an additive, or a nitride, oxide, boride, and carbide of the single substance or the alloyed metal. $C_3N_4$ may be used as the mixture layers 10a, 10b, 13a, 13b, 13c and the DLC layer 12. $C_3N_4$ includes crystallinity and mechanical characteristics similar to diamond and is theoretically harder than the diamond. A layer of $C_3N_4$ is formed by methods such as ionization magnetron sputtering, arc plasma jet CVD, pulsed laser deposition, or reactive ionized cluster beam.

EXAMPLES

The characteristics and performance of the razor blade 1 having the edge 2 of FIG. 1(f) will now be described.

Steps for manufacturing the razor blade 1 will now be described in detail.

Figure 1A:
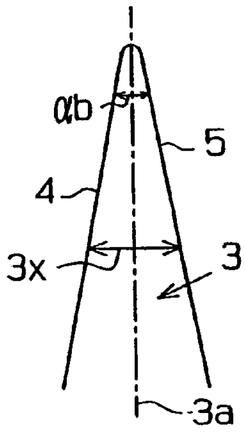
FIGS. 1(*a*) to (*f*) are schematic enlarged views of an edge of a razor blade of FIG. 7 according to a first perspective of the present invention.
Figure 1B:
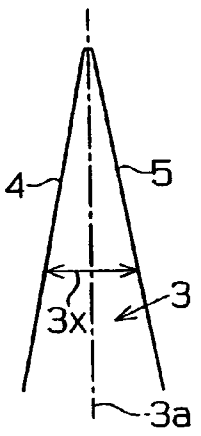
Figure 1C:
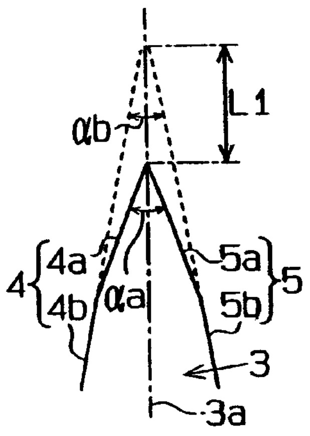

A first step shown in FIG. 1(a) is a blade forming process, in which a stainless steel base plate 3 is ground with a rough grindstone. An edge forming angle αb defined by surfaces 4 and 5 is between 17 to 25 degrees. In a second step shown in FIG. 1(b), the surfaces 4, 5 are ground with a razor strap. In a third step shown in FIG. 1(c), an upper end portion of the base plate 3 is removed by carrying out sputter etching such that an edge forming angle αa of the first surfaces 4a and 5a becomes greater than an edge forming angle αb of the second surfaces 4b and 5b.

Figure 1D:
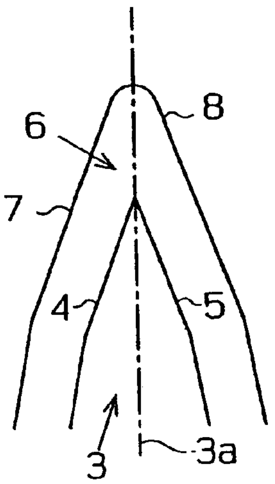
Figure 1E:
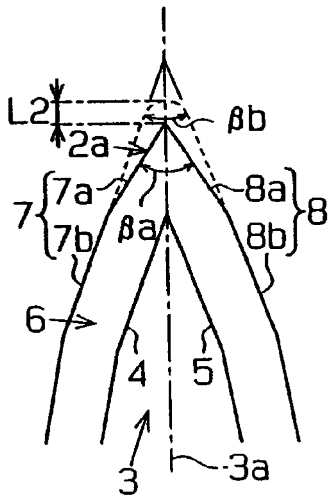
Figure 1F:
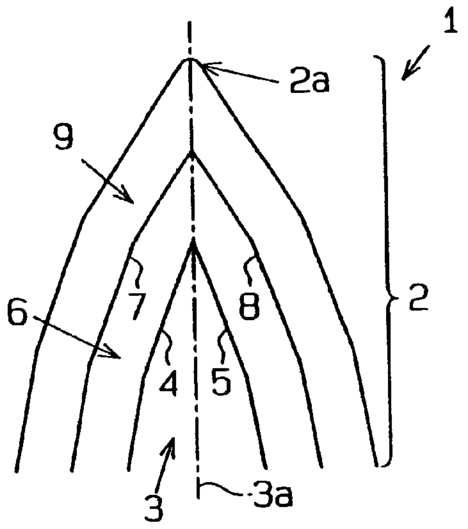
Figure 6A:
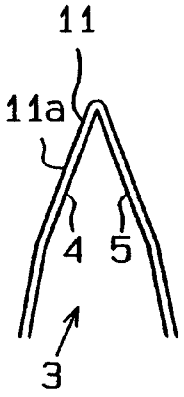
FIGS. 6(*a*) to 6(*c*) show other examples of a process of FIGS. 1(*c*) and 1(*d*).
Figure 6B:
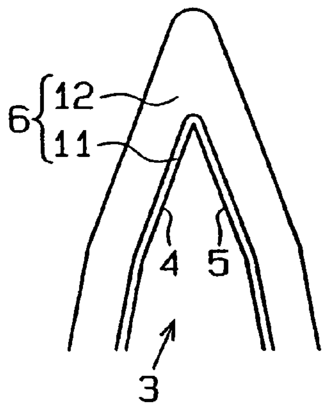
Figure 6C:
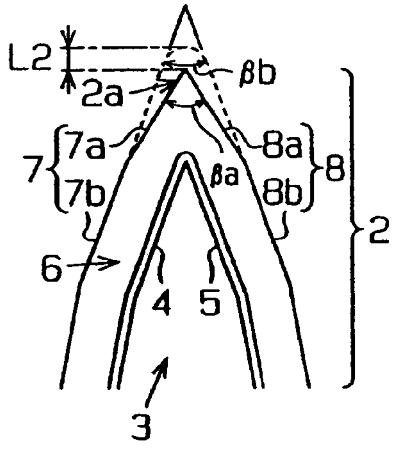

In the present example, steps illustrated in FIGS. 6(a) to 6(c) are performed in lieu of the steps of FIGS. 1(d) and 1(e). In FIG. 6(a), the intermediate layer 11, which coats the base plate 3, is formed by carrying out sputtering. The thickness of the intermediate layer is 5 to 100 nm and preferably 5 to 50% of the thickness of the final coating layer 6. In the present example, the thickness of the intermediate layer 11 is about 25 nm, which is about 25% of the thickness of the final coating layer 6.

In FIG. 6(b), the DLC layer 12, which coats the surface 11a of the intermediate layer 11, is formed by carrying out sputtering. It is preferred that the thickness of the DLC layer 12 be 10 to 200 nm. The thickness is about 75 nm in the present example.

In FIG. 6(c), an upper end of the DLC layer 12 is removed by carrying out sputter etching to form a sharp upper end portion in the DLC layer 12. The removal dimension L2 of the upper portion is preferably between 5 to 150 nm, and more preferably between 50 to 100 nm. The edge forming angle βa of the first surfaces 7a and 8a is between 17 to 45 degrees after the removal while an edge forming angle βb is between 17 to 30 degrees prior to the removal.

Examples 1, 2

Characteristics of Razor Blade 1

A blade of comparative example 1 having an edge (not shown), which coats the base plate 3 with a Cr 100% coating layer, a blade of example 1 having an edge, which has undergone the process of FIG. 6(b) (DLC normal deposition), and a blade of example 2 having an edge, which has undergone the process of FIG. 6(c), (DLC sharpening deposition) were prepared to check the shape, characteristics, and performance of each blade.

The blades of examples 1, 2 and comparative example 1 were observed by a SEM (scanning electronic microscope) to measure the radius of curvature of the tip of the blades. The result is shown in table 1.

TABLE 1

| | Radius (nm) |
|---|---|
| Comparative example 1 | 28 |
| Example 1 | 32 |
| Example 2 | 6 |

Table 1 shows that the radius of curvature of the edge 2 of example 2 is significantly smaller than that of the edges 2 of comparative example 1 and example 1. In other words, since the edge 2 is sharpened in the fifth step, the edge 2 is prevented from becoming blunt and the edge 2 of the blade 1 is sharpened.

A belt, which is uniformly made from wool felt, was successively cut for a fixed number of times by the blades of examples 1, 2 and comparative example 1. The sharpness of each blade was checked by measuring the resistance value a when the belt was cut for the first time and the resistant value b when the belt was cut for the last time. In addition, the durability of the blades was checked in accordance with the increasing rate of the cutting resistance calculated by equation $\{(b-a)/a\}\times 100$. The result is shown in table 2.

TABLE 2

| | Initial value a (mN) | Final value b (mN) | Increasing rate (%) |
|---|---|---|---|
| Comp. example 1 | 365 × 9.8 | 700 × 9.8 | 91.8 |
| Example 1 | 359 × 9.8 | 689 × 9.8 | 90.4 |
| Example 2 | 320 × 9.8 | 649 × 9.8 | 90.1 |

Table 2 shows that value a, value b, and the increasing rate of the blades of examples 1 and 2 are lower than those of the blade of comparative example 1. This is due to the effect of DLC, the friction coefficient of which is low. Further, value a, value b, and the increasing rate of the blade of example 2 is lower than those of the blade of example 1. Accordingly, it is understood that the sharpness of blade of example 2 is increased and maintained. This is due to the sharpening.

After testing the sharpness, deformation of the edges of the blades of examples 1, 2 and comparative example 1 were observed using the SEM. The observed area was restricted within a range of 1 mm in the longitudinal direction of the edge, and portions deformed over 1 μm or more in the longitudinal direction were counted. The result is shown in table 3.

TABLE 3

| | Number of Deformed Portions |
|---|---|
| Comparative example 1 | 12 |
| Example 1 | 9 |
| Example 2 | 8 |

Table 3 shows that the number of deformed portions in examples 1 and 2 is less than that of comparative example 1. In addition, the number of deformed portions of example 2 is about the same as that of example 1 and does not increase despite of the sharpening.

T-type razors to which the blades of examples 1, 2 and comparative example 1 were prepared, and the sharpness of each blade was evaluated by ten testers A to J, who were selected at random to conduct an organoleptic test. The sharpness evaluation was indicated by scores with 10 points given for full marks. A higher score indicates a higher level of sharpness. The result is shown in table 4.

TABLE 4

| | Score | | |
|---|---|---|---|
| Tester | Comparative example 1 | Example 1 | Example 2 |
| A | 7 | 8 | 9 |
| B | 8 | 8 | 8 |
| C | 7 | 8 | 10 |
| D | 9 | 9 | 9 |
| E | 7 | 8 | 8 |
| F | 5 | 6 | 6 |
| G | 6 | 7 | 7 |
| H | 8 | 8 | 10 |
| I | 5 | 6 | 8 |
| J | 5 | 5 | 5 |
| Average | 6.7 | 7.3 | 8.0 |

The average score of example 2 was the highest. In addition, the average score of example 1 is higher than that of comparative example 1.

The above comparison result shows that the sharpened coating layer 6 provides a blade 1 with improved sharpness, and that the durability of the sharpness is increased. Higher effects are accomplished particularly when the radius of curvature of the tip of the edge 2 is less than or equal to 25 nm. The effects resulting from the sharpened coating are also obtained from the coating layers 6 and the superimposed coating layers 6 of FIG. 2(*a*) to FIG. 5(*d*).

Examples 3, 4

In examples 3 and 4, a microtome for producing a microscope sample will now be described.

A blade of a comparative example 2 having an edge (not shown) and a base plate 3 coated by a Cr 100% coating layer, a blade of example 3 having an edge, which has undergone the process of FIG. 6(*b*) (DLC normal deposition), and a blade of example 4 having an edge, which has undergone the process of FIG. 6(*c*) (DLC sharpening deposition) are provided.

The maximum cutting number of the microtome blade was checked as described below. A paraffin block having a predetermined length with an embedded pig liver was prepared. The blades of examples 3, 4 and comparative example 2 were each attached to microtome machines to slice the paraffin block into laminas. The sliced laminas were collected to check the degree of shrinkage. A lower degree of shrinkage indicates that cutting is performed with a smaller resistance and that the blade is sharp. Repeated slicing of laminas normally blunts the blade and gradually increases the degree of shrinkage. The degree of shrinkage of the blade of example 4 was least, next was that of example 3, and example 2 was greatest. This tendency was the same subsequent to the repeated slicing. The maximum number of usage, which is the number of cutting times when reaching the limit shrinkage degree, is shown in table 5.

TABLE 5

| | Maximum Number of Usage |
|---|---|
| Comparative example 2 | 130 |
| Example 3 | 175 |
| Example 4 | 185 |

Table 5 shows that example 4 is the highest, and then example 3, and that comparative example 2 is lowest. The effect is believed to be due to the sharpening of the coating layer 6. It is preferred that an edge forming angle βa be between 15 to 45 degrees such that the blade of the microtome has a sharpness and durability that is in accordance with the hardness of internal organs.

Example 5

A blade of example 5 having an edge coated with the DLC-Pt mixture layer 10*a* shown in FIG. 2(*a*) was prepared. For comparison, a blade of comparative example 1 having an edge coated with a Cr 100% coating layer, a blade of comparative example 3 having an edge coated with a Pt 100% coating layer, and a blade of comparative example 4 having an edge coated with a DLC 100% coating layer were prepared. The shape, characteristics, and performance of the blades of example 5, comparative examples 1, 3 and 4 were checked.

First, a belt, which was uniformly made from wool felt, was successively cut for a fixed number of times by the blades of example 5, comparative examples 1, 3, and 4. The sharpness of each blade was checked by measuring the resistance value a when the belt was cut for the first time and the residence value b when the belt was cut for the last time. Further, the durability of the blades is checked in accordance with the increasing rate of the cutting resistance, which is calculated by equation $\{(b-a)/a\}\times 100$. In addition, the exfoliation was observed using the SEM.

TABLE 6

| | Initial Value a (mN) | Final Value b (mN) | Increasing rate (%) | Exfoliation |
|---|---|---|---|---|
| Comparative example 1 | 365 × 9.8 | 700 × 9.8 | 91.8 | No |
| Comparative example 3 | 363 × 9.8 | 720 × 9.8 | 97.8 | No |

TABLE 6-continued

| | Initial Value a (mN) | Final Value b (mN) | Increasing rate (%) | Exfoliation |
|---|---|---|---|---|
| Comparative example 4 | 357 × 9.8 | 690 × 9.8 | 91.2 | Part |
| Example 5 | 359 × 9.8 | 680 × 9.8 | 87.9 | No |

Value a, value b, and the increasing rate of blades of example 5 and comparative example 4 were lower than those of the blades of comparative examples 1 and 3. This is due to the effect of the low friction coefficient DLC. In addition, value a, value b, and the increasing rate of the blade of example 5 is lower than those of the blade of comparative example 4. Further, the DLC-Pt film is more resistant to exfoliation than the DLC film. Therefore, it is understood that the sharpness of the blade of example 5 is increased and maintained.

Deformation pf the edges of the blades of example 5, comparative examples 1, 3, and 4 were observed using the SEM after checking the sharpness of the blades. The observed area was restricted within a range of 1 mm in the longitudinal direction of the edge, and portions deformed over 1 μm or more in the longitudinal direction were counted. The result is shown in table 7.

TABLE 7

| | Number of Deformed Portions |
|---|---|
| Comparative example 1 | 12 |
| Comparative example 3 | 13 |
| Comparative example 4 | 9 |
| Example 5 | 7 |

Table 7 shows that the number of deformed portions in example 5 is lower than that in comparative examples 1, 3, and 4. The result shows that due to the coating layer 6, which includes DLC and Pt, the blade resists deformation.

TABLE 8

| | Maximum number of usage | |
|---|---|---|
| Tester | Comparative example 3 | Example 5 |
| A | 6 | 6 |
| B | 8 | 12 |
| C | 7 | 9 |
| D | 5 | 5 |
| E | 12 | 15 |
| F | 8 | 9 |
| G | 5 | 6 |
| H | 8 | 10 |
| I | 11 | 13 |
| J | 8 | 8 |

T-type razors to which the blades of examples 5 and comparative example 3 were prepared to compare the maximum number of usage of each blade. Table 8 shows the maximum number of usage declared by the testers A to J. Consequently, 7 out of 10 testers answered that the razor using the blade of example 5 had higher maximum number of usage than the razor using the blade of comparative example 3 while the other 3 testers answered that the maximum number of usage of example 5 was the same as comparative example 3. Therefore, the DLC-Pt film substantially improves the durability of the blade 1.

From the above comparison, the mixture of DLT and Pt results in stronger adhesion between the DLC and the base plate 3. This prevents the coating layer from exfoliating. In addition, the sharpness and durability of the razor blade 1 were improved. Zr, W, Ti, Ag, Cu, Co, Fe, Ge, Al, Mg, Zn, and Cr are preferably used as an aiding material such as Pt. Since Ti, Ag, Cu, and Al are antibacterial, the blade 1, which has a coating layer including the aiding material, is hygienic.

Examples 6, 7

The blade of example 6, which has an edge coated with the DLC-W mixed uniform layer 10*a* shown in FIG. 2(*a*), and the blade of example 7, which has an edge coated with the DLC-W mixture gradient layer 10*b* shown in FIG. 2(*b*) were prepared. For comparison, the blade of comparative example 5, which has an edge coated with a W 100% coating layer, was provided. The shape, characteristics, and performance of the blades of examples 6, 7 and comparative example 5 were checked.

TABLE 9

| | Initial Value a (mN) | Final Value b (mN) | Increasing rate (%) | Exfoliation |
|---|---|---|---|---|
| Comparative example 5 | 380 × 9.8 | 725 × 9.8 | 94.5 | No |
| Example 6 | 358 × 9.8 | 695 × 9.8 | 92.3 | No |
| Example 7 | 355 × 9.8 | 675 × 9.8 | 87.7 | No |

Value a, value b, and the increasing rate of blades of example 6, and 7 were lower that those of comparative example 5. This is due to the effect of the low friction coefficient DLC. In addition, value a, value b, and the increasing rate of the blade of example 7 is lower than those of the blade of example 6. The effect is due to the concentration gradient of an aiding material W.

Deformation of the edges of the blades of example 6, 7, and comparative example 5, were observed using the SEM after checking the sharpness of the blades. The observed area was restricted within a range of 1 mm in the longitudinal direction of the edge, and portions deformed over 1 μm or more in the longitudinal direction were counted. The result is shown in table 10.

TABLE 10

| | Number of Deformed Portion |
|---|---|
| Comparative example 5 | 13 |
| Example 6 | 8 |
| Example 7 | 7 |

The number of deformed portions of examples 6 and 7 were lower than that of example 5. Accordingly, the coating layer 6 including the DLC and the W provides a blade, which was resistant to deformation. Further, the number of deformed portions of example 7 was lower than that of example 6. The effect is due to the concentration gradient of the aiding material W.

TABLE 11

| Tester | Maximum number of usage | |
|---|---|---|
| | Example 6 | Example 7 |
| A | 12 | 13 |
| B | 9 | 11 |
| C | 5 | 10 |
| D | 9 | 12 |
| E | 8 | 9 |
| F | 6 | 7 |
| G | 13 | 15 |
| H | 10 | 10 |
| I | 8 | 9 |
| J | 8 | 8 |

T-type razors to which the blades of examples 6 and 7 were prepared to compare the maximum number of usage of each blade. Table 11 shows the maximum number of usage declared by the testers A to J. Consequently, 8 out of 10 testers answered that the razor using the blade of example 7 had higher maximum number of usage than the razor using the blade of example 6 while the other two testers answered that the maximum number of usage of example 6 was the same as example 6. Therefore, the DLC-W concentration gradient film substantially improves the durability of the blade 1.

From the above comparison, the mixture of DLT and W results in stronger adhesion between the DLC and the base plate 3. This prevents the coating layer from exfoliating. In addition, the sharpness and durability of the razor blade 1 was improved. Pt, Zr, Ti, Ag, Cu, Co, Fe, Ge, al, Mg, Zn, and Cr are preferably used as the aiding material such as the W.

Figure 8A:
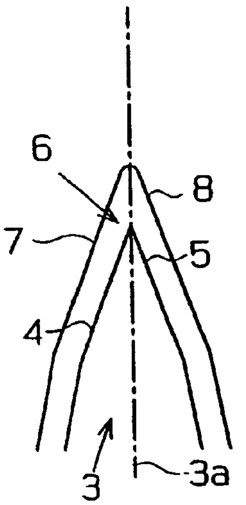
FIGS. 8(*a*) to (*c*) are schematic enlarged views showing an edge of a razor blade according to a second perspective of the present invention.
Figure 8B:
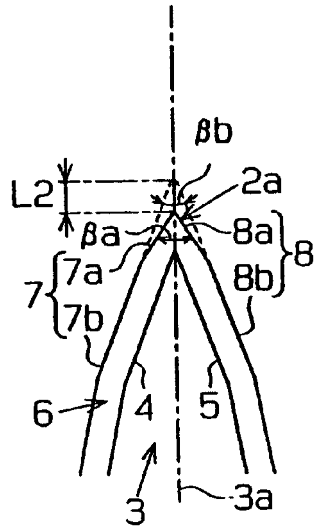
Figure 8C:
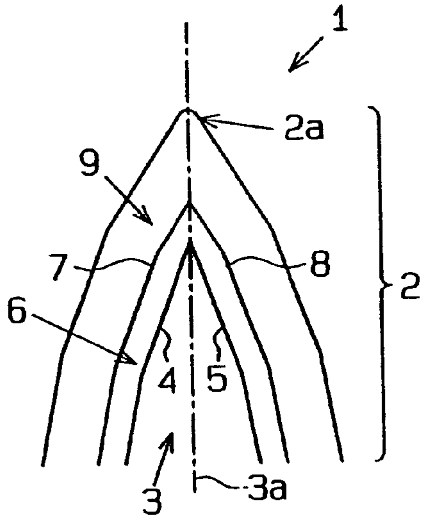

FIGS. 8(*a*) to (*c*) show a process for manufacturing a blade according to a second embodiment. In FIGS. 8(*a*) to (*c*), the main component of a coating layer 6 is at least one metal selected from a group consisting of Pt, Zr, W, Ti, Ag, Cu, Co, Fe, Ge, Al, Mg, Zn, and Cr.

Figure 9:
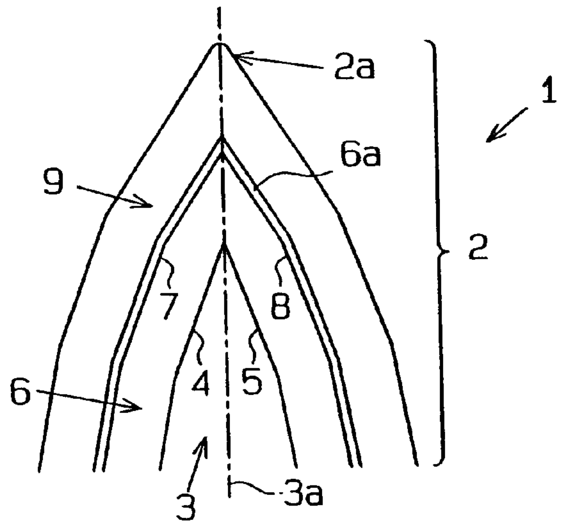
FIG. 9 is a schematic enlarged view showing an edge of a razor blade according to a third perspective of the present invention.

FIG. 9 is a cross-sectional view of a blade 1 according to a third embodiment. The blade 1 includes two coating layers 6 and 6*a*. More specifically, the blade 1 has a thin coating layer 6*a*, which is formed between the fluororesin layer 9 and the coating layer 6 of FIG. 1(*f*). The same type of coating layer 6 those described above was used as the thin coating layer 6*a*.

The first to third embodiments provide a blade 1 with improved sharpness and durability. Further, a hygienic blade 1 is provided by forming the coating layer 6, which includes an antibacterial aiding material.

The surface roughness of the coating layer 6*a*, which is formed on the sharpened coating layer 6, is adjusted to improve the adhesion of the fluororesin layer 9.

The fluororesin layer 9 defining the outermost layer improves the sliding smoothness of the blade 1 during usage.

The first to third embodiments may be modified as described below.

The fluororesin layer 9 may be directly formed on the both surfaces 4 and 5 of the base plate 3 shown in FIG. (1*c*).

The blade 1 and the method for manufacturing the blade 1 of the present invention may be applied to, for example, scalpels, scissors, kitchen knives, nail scissors, and specific industrial use blades in addition to razors and microtomes.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A blade characterized by:

a base plate having an edge;

a mixture layer formed by coating layer for coating at least the edge of the base plate, wherein the coating layer includes at least one metal, which is selected from a group consisting of Pt, Zr, W, Ti, Ag, Cu, Go, Fe, Ge, Al, Mg, Zn, and Cr, and a carbon material; and wherein the coating layer is partially removed by at least one of sputtering, vapor deposition, ion plating, and vapor phase growth.

2. A blade including a base plate having an edge and a coating layer for coating at least the edge, the blade being characterized in that the coating layer includes:

an intermediate layer which main component is at least one metal selected from a group consisting Pt, Zr, Ag, Cu, Co, Fe, Ge, Mg, and Zn; and a carbon layer formed on the intermediate layer.

3. A blade including a base plate having an edge and a coating layer for coating at least the edge, the blade being characterized in that the coating layer includes:

an intermediate layer which main component is at least one metal, which is selected from a group consisting of Pt, Zr, W, Ti, Ag, Cu, Co, Fe, Ge, Al, Mg, Zn, and Cr;

a mixture layer formed on the intermediate layer and including at least one metal, which is selected from a group consisting of Pt, Zr, W, Ti, Ag, Cu, Co, Fe, Ge, Al, Mg, Zn, and Cr, and a carbon material; and wherein the concentration of the metal in the mixture layer chances as the surface of the mixture layer becomes closer.

4. The blade according to claim 1, characterized in that the concentration of the metal in the mixture layer is substantially uniform.

5. The blade according to claim 1, characterized in that the concentration of the metal in the mixture layer changes as the surface of the mixture layer becomes closer.

6. A blade characterized by:

a base plate having an edge narrowed toward a tip of the edge; and a coating layer for coating at least the edge, wherein the coating layer is formed by partially removing the coating layer at the tip side of the edge and has at least one tapered surface, which is tapered toward the tip of the edge.

7. The blade according to claim 6, characterized in that the at least one tapered surface is one of two first tapered surfaces, which are connected to each other at the tip of the edge, the coating layer further includes two second tapered surfaces, which are formed to extend continuously from the two first tapered surfaces, respectively, at positions spaced from the tip of the edge, and an angle between the two first tapered surfaces is greater than an angle between the two second tapered surfaces.

8. The blade according to claim 6, further characterized by a second coating layer formed on the coating layer.

9. A blade including an edge defined by two surfaces, the blade characterized in that the edge includes tapered surfaces formed by partially removing at least one of the two surfaces;

a coating layer for coating the base plate; and wherein the coating layer includes an intermediate layer, which main component is at least one metal selected from a group consisting of Pt, Zr, W, Ti, Ag. Cu, Co. Fe, Ge, Al, Mg, Zn, and Cr and a mixture layer formed on the intermediate layer, which includes at least one metal selected from a group consisting of Pt, Zr, W, Ti, Ag, Cu, Co, Fe, Ge, Al, Mg, Zn, and Cr and a carbon material.

10. The blade according to claim 9, characterized in that the tapered surface is defined on each of the two surfaces of the base plate and is one of two first tapered surfaces connected to each other at the tip of the edge, the base plate further includes two second tapered surfaces extending continuously from the two first tapered surfaces, respectively, at positions spaced from the tip of the edge, and an angle between the two first tapered surfaces is greater than an angle between the two second tapered surfaces.

11. A blade characterized by:

a base plate having an edge defined by two surfaces, wherein the base plate includes two first inner tapered surfaces, which extend along the two surfaces from an end of the base plate, and two second inner tapered surfaces, which extend continuously from the two first inner tapered surfaces, respectively, and an angle between the two first inner tapered surfaces is greater than an angle between the two second inner tapered surfaces; and a coating layer for coating the base plate, wherein the coating layer includes two first outer tapered surfaces, connected to each other at a tip of the edge, and two second outer tapered surfaces, which extend continuously from the two first outer tapered surfaces, respectively, and an angle between the two first outer tapered surfaces is greater than an angle between the two second outer tapered surfaces and wherein the coating layer is formed by partially removing the coating layer at the tip side of the edge.

12. The blade according to claim 11, further comprising a second coating layer formed on the coating layer.

13. The blade according to claim 6, characterized in that the coating layer has a mixture layer, which includes at least one metal selected from a group consisting of Pt, Zr, W, Ti, Ag, Cu, Co, Fe, Ge, Al, Mg, Zn, and Cr, and a carbon material.

14. The blade according to claim 6, characterized in that the coating layer includes an intermediate layer, which main component is at least one metal selected from a group consisting of Pt, Zr, W, Ti, Ag, Cu, Co, Fe, Ge, Al, Mg, Zn, and Cr, and a carbon layer formed on the intermediate layer.

15. The blade according to claim 6, characterized in that the coating layer includes an intermediate layer, which main component is at least one metal selected from a group consisting of Pt, Zr, W, Ti, Ag, Cu, Co, Fe, Ge, Al, Mg, Zn, and Cr and a mixture layer formed on the intermediate layer, which includes at least one metal selected from a group consisting of Pt, Zr, W, Ti, Ag, Cu, Co, Fe, Ge, Al, Mg, Zn, and Cr, and a carbon material.

16. The blade according to claim 13, characterized in that the concentration of the metal in the mixture layer is substantially uniform.

17. The blade according to claim 13, characterized in that the concentration of the metal in the mixture layer changes as the surface of the mixture layer becomes closer.

18. The blade according to claim 1, characterized in that an outermost layer of the blade is coated with a fluororesin layer.

19. The blade according to claim 1, characterized in that the base plate is a base plate for a razor blade or a microtome blade.

20. A method for manufacturing a blade, characterized by:

preparing a base plate having two surfaces;

forming the two surfaces of the base plate so that the space between the two surfaces is narrowed as an end of the base plate becomes closer;

forming a coating layer for coating at least the end of the base plate;

forming at least one tapered surface, which is tapered from a position corresponding to the edge of the coating layer, by partially removing the coating layer; and wherein the removal is performed by at least one of sputtering, vapor deposition, ion plating, and vapor phase growth.

21. A method for manufacturing a blade, characterized by:

preparing a base plate having two surfaces and an end defined by the two surfaces;

forming a coating layer for coating at least the end of the base plate;

forming a tapered surface by removing at least one of two surfaces of the coating layer corresponding to the two surfaces of the base plate; and forming a second coating layer on the coating layer.

22. A method for manufacturing a blade, characterized by:

preparing a base plate having two surfaces;

forming the two surfaces of the base plate so that the space between the two surfaces is narrowed as an end of the base plate becomes closer;

forming a tapered surface by removing at least one of the two surfaces of the base plate and;

and applying an intermediate layer which main component is at least one metal selected from a group consisting Pt. Zr, Ag, Cu, Co. Fe. Ge, Mg, and Zn.

23. A method for manufacturing a blade characterized by, preparing a base plate having two surfaces;

forming the two surfaces of the base plate so that the space between the two surfaces is narrowed as an end of the base plate becomes closer;

forming a tapered surface by removing at least one of the two surfaces of the base plate; and forming a coating layer including a mixture layer for coating the tapered surface wherein the concentration of the metal in the mixture layer changes as the surface of the mixture layer becomes closer.

24. The method for manufacturing a blade according to claim 20, characterized in that the coating layer includes a mixture layer, which main component is at least one metal selected from a group consisting of Pt, Zr, W, Ti, Ag, Cu, Co, Fe, Ge, Al, Mg, Zn, and Cr and a carbon material.

25. The method for manufacturing a blade according to claim 20, characterized in that the coating layer includes an intermediate layer, which main component is at least one metal selected from a group consisting of Pt, Zr, W, Ti, Ag, Cu, Co, Fe, Ge, Al, Mg, Zn, and Cr, and a carbon layer formed on the intermediate layer.

26. The method of manufacturing a blade according to claim 20, characterized in that the coating layer includes an intermediate layer, which main component is at least one metal selected from a group consisting of Pt, Zr, W, Ti, Ag, Cu, Co, Fe, Ge, Al, Mg, Zn, and Cr, and a mixture layer formed on the intermediate layer, which has at least one metal selected from a group consisting of Pt, Zr, W, Ti, Ag, Cu, Co, Fe, Ge, Al, Mg, Zn, and Cr and a carbon material.

27. The method for manufacturing a blade according to claim 24, characterized in that the concentration of the metal in the mixture layer is substantially uniform.

28. The method for manufacturing a blade according to claim 24, characterized in that the concentration of the metal in the mixture layer changes as a surface of the mixture layer becomes closer.

29. The method for manufacturing a blade according to claim 20, characterized in that the coating layer is formed by at least one of sputtering, vapor deposition, ion plating, and vapor phase growth.

30. The blade according to claim 3, characterized in that the concentration of the metal in the mixture layer is substantially uniform.

31. The blade according to claim 3, characterized in the concentration of the metal mixture in the mixture layer changes as the surface of the mixture layer becomes closer.

32. The blade according to claim 10, further comprising a coating layer for coating the base plate.

33. The blade according to claim 15, characterized in that the concentration of the metal in the mixture layer is substantially uniform.

34. The blade according to claim 15, characterized in that the concentration of the metal in the mixture layer changes as the surface of the mixture layer becomes closer.

* * * * *